United States Patent [19]
Daniels et al.

[11] 3,819,335
[45] June 25, 1974

[54] PREPARATION OF MACROCRYSTALLINE, HEXAGONAL ALUMINUM HYDRIDE

[75] Inventors: Roger D. Daniels; John A. Snover, both of Midland, Mich.

[73] Assignee: The Dow Chemical Company, Midland, Mich.

[22] Filed: Nov. 15, 1967

[21] Appl. No.: 684,099

[52] U.S. Cl. .................... 23/300, 23/305, 423/645
[51] Int. Cl. ......................... B01j 17/00, C01b 6/00
[58] Field of Search ............. 23/204, 360, 365, 305

[56] References Cited
OTHER PUBLICATIONS
M. J. Rice et al., Non-Solvated Aluminum Hydride, Technical Report of Onr. ASTIA AD No. 106967, Aug. 1, 1956.

Primary Examiner—Leland A. Sebastian
Attorney, Agent, or Firm—C. Kenneth Bjork

[57] ABSTRACT

An improved process for preparing macrocrystalline, substantially non-ether solvated aluminum hydride wherein an aluminum hydride feed material is carried in a liquid of about the same composition as the crystallizing liquid thereby eliminating the need for removal of excess ether solvent from the crystallizing system as practiced heretofore.

8 Claims, 1 Drawing Figure

PATENTED JUN 25 1974
3,819,335
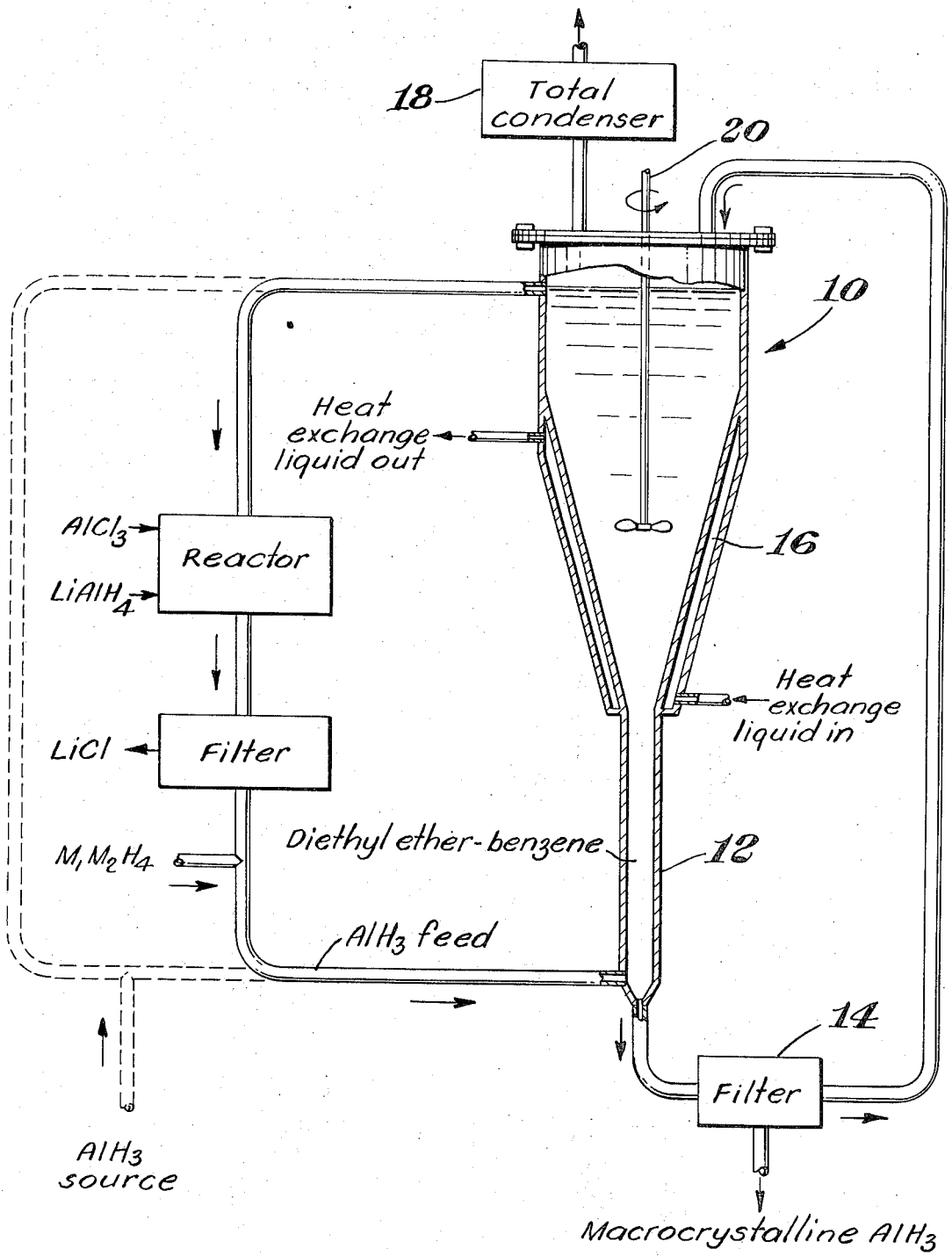
INVENTORS.
Roger D. Daniels
John A. Snover
BY
C. Kenneth Bjork
AGENT

PREPARATION OF MACROCRYSTALLINE, HEXAGONAL ALUMINUM HYDRIDE

BACKGROUND OF THE INVENTION

Non-solvated, crystalline aluminum hydride has been found to be suitable for use as a fuel component in solid rocket propellants.

A number of methods are known for making various polymorphic crystalline phases of aluminum hydride. In general, these processes employing an alkyl ether as a solvent have the disadvantage that the resulting products are contaminated with impurities and are essentially all in a very fine state of subdivision, e.g. submicron in size, which renders these undesirable for propellant applications. Also, the resulting products as produced are solvated and the solvent member, e.g. ether, is removed with difficulty ordinarily by high vacuum techniques.

A novel process for preparing relatively large size, i.e. from about 10 to about 50 microns, and larger, crystalline aluminum hydride particles (hereinafter sometimes referred to as macrocrystalline particles) which are substantially non-ether solvated has been disclosed in a copending U.S. patent application, Ser. No. 234,275 of Donald L. Schmidt and Ronald W. Diesen, filed Oct. 23, 1962.

In accordance with the process of application Ser. No. 234,275, an ether soluble aluminum hydride is formed, or a previously prepared ether soluble aluminum hydride material is redissolved in an ether solvent, preferably in the presence of a complex metal hydride which is soluble in the ethereal solution, to provide a solution having an $AlH_3$/ether ratio of from about 0.05 to about 1 on a gram mole basis. The solvent can be any of those ether materials which act as a solvent for the aluminum hydride, including for example, diethyl ether, tetrahydrofuran and the like.

Substantially non-solvated large-sized, particulate, crystalline aluminum hydride particles ranging from about 10 to about 50 microns or larger form directly in the reaction solution if the temperature is maintained at from about 50° to 85° C. and preferably at from about 60° to about 80° C., and most desirably at about 75°–77° C. This result is unexpected in view of the fact that the product obtained from the same solutions at lower temperatures is substantially completely solvated and of undesirably small sized, e.g. sub-micron particles.

In carrying out this process with low boiling ether solvents the desired crystallization temperatures are obtained by controllably increasing the pressure on the solution while heating thereby to raise the effective boiling point of the solution and give a predetermined reaction temperature. Alternatively, and preferably, an ether solution of aluminum hydride is introduce into an inert organic liquid having a higher boiling point than the ether, and preferably above about 80° C., to provide a solution having a normal boiling point of at least 50° C. This eliminates the need for use of superatmospheric pressure. Liquid hydrocarbons, preferably having a boiling point of above 80° C., such as for example, benzene, toluene, biphenyl, xylene, biphenyl benzene, decane and the like were found by Schmidt and Diesen to be particularly suitable.

On advantage of the process disclosed in application, Ser. No. 234,275 is that by controlling the reaction conditions relative to the treatment of the heated solvent during the crystallization step high concentrations of macrocrystalline particles of substantially non-solvated aluminum hydride in preferential and predetermined phases are formed in the reaction mass. In particular, if the solution is concentrated by removal of the lower boiling component, i.e. the ether, of a solvent mixture during the elevated temperature treatment, predominantly there is produced large crystals of a substantially solvent-free hexagonal aluminum hydride having a density greater than about 1.4 grams per centimeter and a unique X-ray diffraction pattern. This novel aluminum hydride has been disclosed in a copending application, Ser. No. 179,509 of Norman E. Matzek and Donald F. Musinski, filed Mar. 8, 1962 and is identified therein as alpha-aluminum hydride.

This particular aluminum hydride, especially in large macrocrystalline size particles, has been shown to be especially suitable and effective as a fuel component in solid propellants. The large crystals themselves offer ease of handling and storage both from the standpoint of formulation and safety. They show a markedly decreased reactivity in air and increased resistance to flashing and burning over that exhibited by sub-micron particles. Further, when used in propellant formulations, these large hexagonal crystals exhibit excellent compatibility and blendability with the other ingredients employed in the formulation.

In practice the large, hexagonal crystals of aluminum hydride ordinarily are crystallized by introducing a diethyl ether solution of aluminum hydride into a higher boiling solvent, e.g. benzene, and then fractionally distilling the ether therefrom to provide a benzene-diethyl ether mixture maintained at a maximum of about 10 volume per cent ether and having a boiling point of rom about 74°–80° C. Specific studies have shown a benzene-diethyl ether solvent mixture containing about 5.7 volume per cent diethyl ether and having a reflux temperature of about 76.5° C. gives optimum crystal size and excellent yields of the desired substantially non-solvated hexagonal crystalline aluminum hydride.

This process which gives good yields of the desirable macrocrystalline, hexagonal, substantially non-solvated aluminum hydride (i.e. alpha-aluminum hydride) in operation is quite complex in that desolvation, phase conversion, crystallization and distillation operations are occurring simultaneously in the reaction medium.

Since the process practiced heretofore is based on introduction of an ether solution into a higher boiling liquid, in order to provide the low ether concentration (less than about 10 volume per cent) required to crystallize the desired alpha aluminum hydride, continuous fractionation of the reaction mass is required. Such a distillation step dictates the need for high heat transfer rates and consequently high wall temperatures in the reactor. This is undesirable since high wall temperatures can induce autodecomposition of the aluminum hydride product while still in the reactor.

It is a principal object of the present invention to provide an improved process for the preparation of macrocrystalline substantially non-solvated aluminum hydride which substantially completely eliminates the possibility of product decomposition in the reactor and which also is less complex than the process practiced heretofore.

It is another object of the present invention to provide a novel process for preparing macrocrystalline aluminum hydride which can be carried out on a continuous basis.

These and other objects and advantages readily will become apparent from the detailed description presented hereinafter when read in conjunction with the appended drawing.

The FIGURE of the drawing is a schematic flow diagram of a preferred embodiment of the improved process of the present invention.

SUMMARY

In general, the present process comprises providing an aluminum hydride feed solution or slurry employing as a solvent or carrier either a mixture of an ether and an organic liquid miscible with said ether and having a boiling point higher than that of the ether or the organic liquid itself. The aluminum hydride concentration in the feed material usually ranges from about 0.005 to about 3 molar. The aluminum hydride feed mixture at a temperature of from the freezing point up to the boiling point of the liquid phase is introduced into a crystallizer containing a quantity of the higher boiling liquid. Ordinarily, the crystallizer contains a mixture of ether and the higher boiling liquid of a predetermined concentration to provide a final equilibrium crystallizing liquid composition having a maximum of about 10 volume per cent ether. This is maintained at about reflux under total condensing conditions. Macrocrystalline, hexagonal, substantially non-solvated aluminum hydride particles crystallize and grow therein. These are removed from the crystallizer, the residual solvent liquid which is at equilibrium with respect to dissolved aluminum hydride ordinarily being recycled for use in preparing additional aluminum hydride feed.

Usually, the aluminum hydride feed material is prepared directly for use in the present process by reacting lithium aluminum hydride and aluminum chloride in a recirculated alpha-aluminum hydride depleted ether-higher boiling liquid solvent mixture. Alternatively, aluminum hydride prepared by other processes or a solid ether solvated aluminum hydride can be dissolved and/or slurried in the crystallizing solvent system for use in the process.

DESCRIPTION OF PREFERRED EMBODIMENTS

Ordinarily, in the practice of the present invention as shown by the embodiment in the FIGURE of the drawing, a diethyl ether-benzene solution at a temperature of from about 0° up to about 77° C., preferably about 50° C., at a maximum of about 6 volume per cent diethyl ether and being from about 0.005 to about 1 molar, preferably from about 0.0 to about 0.3 molar in aluminum hydride, or a slurry of up to about 20 weight per cent finely divided aluminum hydride carried in a diethyl ether-benzene mixture or benzene alone is introduced into a crystallizer 10 near the bottom of an elutriation leg 12. Usually the crystallizer already contains an additional quantity of a diethyl ether-benzene solution. The resulting equilibrium crystallizing solution is predetermined to contain a maximum of about 10 volume per cent ether, usually at from about 5 to about 6 volume per cent and most desirably about 5.7 volume per cent of the ether. The solution in the crystallizer is maintained at from about 74°–80° C., preferably from about 75°–77° C. Conveniently, the reaction temperature is maintained by an external heating jacket or mantle such as an annular cover 16 through which is circulated an organic heat exchange liquid, steam, water, or other heat exchange media at a predetermined temperature. Other reactor heating means can be employed including electrical resistance heaters and the like. The feed rate is maintained such that substantially non-solvated, hexagonal aluminum particles crystallize and/or grow in the reactor to a particle size of from about 10 to 50 microns or larger, finally settling to the bottom of the elutriation leg where they are removed as by a filter 14 or other solids-liquid separatory means. The residual liquid is transported back into the crystallizer 10 for reuse.

As the crystallization proceeds, the diethyl ether-benzene crystallizing liquid becomes depleted in aluminum hydride as it rises to the top of the crystallizer 10. This low aluminum hydride concentration equilibrium liquid is recycled for reuse as a solvent or carrier for additional aluminum hydride source material. An unexpected advantage of the present process resides in the fact that because the aluminum hydride depleted carrier is recycled there is substantially no loss of the aluminum hydride reactant from the system.

The reactor usually is fitted with a condenser. This is designed to operate and totally condense the diethyl ether-benzene crystallizing liquid thus assuring a substantially constant concentration of this liquid mixture in the system.

A mechanical agitator 20 also ordinarily is inserted in the reactor and utilized during operation to provide a predetermined amount of agitation in the system such that the crystal nuclei are agitated and grow, remaining suspended until they reach macrocrystalline size before settling in the elutriation leg 12. This, along with the upflow of feed material through the elutriation, aids in crystal separation and at least partial classification of crystals at the same time.

The present process is particularly adapted for efficient continuous operation. However, if desired, the process can be carried out in batch, semi-continuous, cyclic, or cyclic batch type operations.

The aluminum hydride reactant usually employed is the reaction product resulting from the well-known reaction of aluminum chloride ($AlCl_3$) and lithium aluminum hydride ($LiAlH_4$) in a diethyl ether-benzene liquid mixture. Solutions of aluminum hydride produced by any other process also can be used. Further, a solid ether solvated aluminum hydride can be redissolved or slurried in an aliphatic ether-benzene solution and this mixture then be used as the initial aluminum hydride reactant in the present novel process.

As indicated hereinbefore, the aluminum hydride feed material can be either a solution or a slurry of finely divided aluminum hydride. The latter embodiment provides an advantage in that a shorter crystallization period is required to reach the desired macrocrystalline particle size as the prior formed particles serve directly as nuclei for crystal growth. By using a slurry feed containing nuclei precipitated external to the reactor a closely controlled solids content in the crystallizer also can be realized.

The slurries can be made by precipitating an aluminum hydride etherate from a relatively concentrated, e.g. about 1 molar, solution of aluminum hydride in an ether, for example, diethyl ether, filtering off the precipitated aluminum hydride feed particles and redispersing these in a predetermined quantity of the higher boiling liquid, e.g. benzene. Conveniently, the slurry feed material can be made directly in an ether-higher boiling liquid mixture, usually a diethyl ether-benzene mixture containing from about 25 to 50 volume per cent of the ether and 75 to about 50 volume per cent benzene. In this embodiment the ether solvent can be stripped off by vacuum until the desired slurry concentration is reached. By subjecting the solid aluminum hydride feed particles to a shearing action such as is achieved in a high shear mixer the feed nuclei are placed in a more desirable finely divided relatively uniform state.

In practice, it has been found that slurry feeds containing up to 10 weight per cent or more of solid aluminum hydride can be fed directly to the crystallizer to produce the desired hexagonal, macrocrystalline substantially non-ether solvated aluminum hydride.

At equilibrium conditions the carrier liquid for the aluminum hydride feed material is of the same composition as the crystallizing solution. However, during start-up, to facilitate the initial nucleation of particles in the crystallizer a solution higher in ether, e.g. up to about 40 volume per cent in diethyl ether, for example, can be utilized. This is added in relatively small and controlled quantities, based on the total volume of crystallizing liquid, to an ether poor benzene solution in the crystallizer. The relative quantities of the solutions and respective volumes of ether in the mixtures are calculated and controlled so as to provide an equilibrium crystallizing liquid for recycle which is of a predetermined ether-higher boiling liquid proportion within the disclosed range. The use of a higher ether concentration in the nucleating feed solution primarily offers the advantage of permitting the use of high aluminum hydride concentrations which in turn serves to bring about a faster and greater initial nucleation of seed particles in the crystallizer. Subsequent feed solutions can be prepared using the equilibrium solvent system.

In the instances where the nuclei are prepared external to the crystallizer and carried as a slurry by the ether-higher boiling liquid crystallizing system, the desired concentration of ether utilized during the operation can be established at the initial start of the process. In these operations, since the aluminum hydride precipitates as the etherate when prepared in ether containing solvents, the feed slurry can be adjusted to take into account this ether to assure the maintaining of the proper ether content in the final crystallizing liquid.

Usually, a complex metal hydride corresponding to the empirical formula $M_1^{+1}M_2^{+3}H_4$ such as for example, $LiAlH_4$, $LiBH_4$, $NaAlH_4$, $NaBH_4$ or mixtures thereof, is incorporated into and dissolved in the aluminum hydride reactant mixture to provide the complex metal hydride/$AlH_3$ gram mole ratio described hereinbefore. For those solutions wherein the macrocrystalline aluminum hydride is to be recovered directly from a reaction product mixture, for example, by reacting $AlCl_3$ and $LiAlH_4$ in diethyl ether-benzene, the amount of $M_1^{+1}M_2^{+3}H_4$ complex hydride to be employed is to be in excess of the $LiAlH_4$ required stoichiometrically for the preparation of the aluminum hydride reactant.

Inert organic liquids having a higher boiling point than the ether and which provide a crystallizing solution containing a maximum of 10 volume per cent ether having a boiling point of at least about 60° C. have been found to be particularly suitable for the practice of the present invention. Liquid hydrocarbons such as benzene, toluene, biphenyl, xylene, biphenyl benzene, decane, an azeotrope of 1 part by volume benzene to 1.15 parts by volume cyclohexane, an azeotrope of 1 part by volume benzene to 1.35 parts by volume 2,4-dimethyl pentane, a 1:1 volume mixture of benzene:n-hexane, n-hexane, a 1:1.5 volume benzene:3-methyl pentane mixture, a 1:1.5 volume benzene:2,3-dimethylbutane mixture, 2,3-dimethylbutane, 2,2-dimethylbutane and the like all are satisfactory. Benzene ordinarily is employed.

For optimum in product yield and purity, all processing and material handling, both of reactants and products, is carried out in a substantially anhydrous inert atmosphere.

The present invention is illustrated further by the following Examples but is not meant to be limited thereto.

EXAMPLE 1

A crystallizer reactor vessel having the following characteristics was fabricated from Pyrex glass. The reactor body was a 6 inch diameter vessel having a conical bottom and a dome shaped head. The total volume was about 4 liters. The bottom (apex) of the cone communicated with a three-fourths inch diameter elutriation leg. This cone shaped section was equipped with a heating jacket and fittings for communicating with a source of crystallizing liquid and a nucleating aluminum hydride feed solution, for use if nucleation was to be carried out in the crystallizer during start-up. The bottom of the elutriation leg communicated by means of a port in its side wall with a dilute aluminum hydride feed source. A conduit in the side wall of the vessel near its top communicated with an aluminum hydride make-up supply source. This source in turn communicated with an inlet in the elutriation leg and/or nuclei entrance port. Additionally, the reactor was fitted with a total condenser and agitator. A tapered sump in the bottom of the elutriation leg communicated with a liquid-solids separatory apparatus.

Using this apparatus, a total volume of about 4 liters of a benzene-diethyl ether mixture (3.5 volume per cent ether) was introduced into the crystallizer and heated at atmospheric pressure under total reflux to its boiling point (78.3° C.)

An aluminum hydride source material was prepared by reacting in about 1333 ml. of a mixed diethyl ether-benzene solvent system containing 27.4 volume per cent ether, 0.306 gram mole of lithium aluminum hydride and 0.10 gram mole of aluminum chloride using conventional reaction techniques. This reaction mixture gave a 5 per cent molar excess of $LiAlH_4$ in the reaction mass. The resulting 0.3 molar aluminum hydride solution, after separation of by-product solid lithium chloride, was separated into two portions.

The first portion, about 186 milliliters, containing about 0.055 gram mole of aluminum hydride was mixed with 10 milliliters of a 1 molar ether solution of lithium aluminum hydride and this added to the refluxing crystallizing liquid in the crystallizer at the rate of 19.6 milliliters per minute. This solution served as an aluminum hydride nucleating source. The addition of this mixture to the crystallizer increased the ether content of the total crystallizing liquid to 4.5 volume per cent, the reflux temperature dropping to 77.2° C. The actual concentration of aluminum hydride in the crystallizing solution was 0.015 molar. After about 15 minutes particle nucleation was observed.

The second 1147 milliliter portion of the aluminum hydride feed material was diluted with benzene to give a 5.5 volume per cent mixture of diethyl ether in benzene thereby reducing the aluminum hydride concentration of this solution to about 0.06 molar. This solution was preheated and maintained within a range of from about 50°–57° C. and introduced into the crystallizer at an average rate of 21 milliliters per minute over a period of about 207 minutes. During this period, the temperature of the refluxing solution was within the range of 76.8°–78.3° C. The resulting crystallizing liquid had a diethyl ether concentration of about 5.4 volume per cent.

The crystalline product was sampled from the bottom of the crystallizer after about 195 minutes from the start of the introduction of the second portion of aluminum hydride feed material into the crystallizer. Visual microscopic observation and X-ray diffraction indicated these to be the alpha-macrocrystalline, hexagonal, substantially non-ether solvated aluminum hydride.

The equilibrium ether-benzene crystallizing solution containing dissolved aluminum hydride usually is recycled to a reactor and lithium aluminum hydride and aluminum chloride are reacted therein to produce additional aluminum hydride feed material. Excess $M_1M_2H_4$ complex hydride is added to the feed material as set forth hereinbefore and this feed material introduced into the crystallizer while maintaining the conditions set forth hereinbefore to provide a continuous process for preparing the macrocrystalline, hexagonal aluminum hydride. The product particles are removed on a periodic or continuous basis from the elutriation leg.

EXAMPLE 2

About 400 milliliters of an ether solution of lithium aluminum hydride (1 molar in LiAlH$_4$), 125 milliliters of a diethyl ether solution of aluminum chloride (1 molar in AlCl$_3$) were admixed with 475 milliliters of substantially anhydrous diethyl ether and 1,000 milliliters of substantially anhydrous benzene and the mass reacted following conventional aluminum hydride preparation techniques. This provides a product mixture containing 2,000 milliliters total volume and having 500 millimoles of aluminum hydride. The product mixture was filtered to remove precipitated lithium chloride. The filtrate was stirred for a period of from about 20–30 minutes with an excess of finely ground sodium borohydride to remove any residual lithium chloride from solution and the so-treated product mass refiltered.

The filtrate was concentrated to a final volume of 0.5 liter by subjecting it to a low pressure at ambient temperature. During this process step, aluminum hydride diethyl etherate precipitated in the carrier liquid. The resulting slurry was agitated in a high shear mixer (Waring Blender) for about 15 minutes and then placed in an addition funnel. The mix was agitated while in the funnel by means of a mechanical stirrer to keep the resulting finely divided aluminum hydride etherate nuclei in suspension.

The aluminum hydride feed material was added in incremental amounts, 20 milliliters of slurry every 10 minutes, to a crystallizer of the same design as described in Example 1 which contained an equilibrium crystallizing liquid of 95 volume per cent benzene-5 volume per cent diethyl ether. The addition of the slurry did not substantially change the crystallizing liquid composition. This liquid also contained some nuclei of hexagonal, non-ether solvated aluminum hydride and a small quantity of lithium aluminum hydride.

The crystallizing liquid was maintained at about 76°–76.5° C. Periodically, macrocrystalline particles were removed from the elutriation leg. These were analyzed and found to be substantially non-ether solvated, hexagonal crystal form aluminum hydride.

EXAMPLE 3

Following the procedure set forth in Example 2, five liters of 0.25 molar solution of aluminum hydride in a 50 volume per cent diethyl ether-50 volume per cent benzene was prepared and concentrated to approximately 1 liter. The resulting solid aluminum hydride diethyl etherate-benzene slurry was stirred for 15 minutes in the Waring Blender.

The resulting slurry was added incrementally to 4 liters of a mixture of benzene ($\approx$94 volume per cent) and diethyl ether ($\approx$6 volume per cent) maintained at 76° C. Additionally, several additions of hexagonal aluminum hydride crystal nuclei were added to the crystallizer to simulate equilibrium conditions present in a continuous operation. In this crystallizing operation, about 20 milliliters of the aluminum hydride slurry feed were added at 5 minute intervals over a three hour period. This feed rate then was increased to 40 milliliters of slurry every 5 minutes. No adverse effects in crystal gorwth were noticed from the increased rate.

Periodic sampling and analysis of the product from the sump of the elutriation leg showed the product to be substantially all macrocrystalline, non-ether solvated, hexagonal aluminum hydride.

Various modifications can be made in the present invention without departing from the spirit or scope thereof for it is understood that we limit ourselves only as defined in the appended claims.

We claim:

1. A process for preparing a macrocrystalline, hexagonal, substantially non-solvated aluminum hydride which comprises;
   a. providing an aluminum hydride feed material, wherein the concentration of aluminum hydride ranges from about 0.005 to about 3 moles, said feed material comprising aluminum hydride carried in a mixture of an aliphatic ether and a liquid hydrocarbon miscible with said ether, said liquid hydrocarbon having a boiling point higher than that of said ether,
   b. introducing said liquid mixture containing said aluminum hydride feed material into a crystallizing liquid in a crystallizer, said crystallizing liquid being comprised of a mixture of said ether and said higher boiling liquid hydrocarbon, the relative quantities of the liquid carrier mixture for said aluminum hydride and said crystallizing liquid being such to provide an equilibrium composition having a maximum of about 10 volume per cent ether,
   c. maintaining the resulting mixture at about the reflux temperature of said equilibrium crystallizing liquid composition and under a total reflux of said liquid composition whereupon macrocrystalline, hexagonal, substantially non-solvated aluminum hydride crystallizes therein, and d. separating said aluminum hydride crystals from said crystallizing liquid.

2. The process as defined in claim 1 wherein the carrier liquid for said aluminum hydride and the crystallizing liquid are mixtures of diethyl ether and benzene.

3. The process as defined in claim 1 and including the steps of removing aluminum hydride depleted equilibrium crystallizing liquid from the crystallizer, introducing additional aluminum hydride feed material into said aluminum hydride depleted crystallizing liquid and returning the resulting mixture to said crystallizer for macrocrystalline, substantially non-solvated aluminum hydride crystal growth.

4. The process as defined in claim 2 wherein the equilibrium crystallizing liquid composition contains at a maximum about 6 volume per cent diethyl ether.

5. The process as defined in claim 2 wherein the aluminum hydride feed is a solution of aluminum hydride in a mixture of diethyl ether and benzene, said solution ranging from about 0.005 up to about 0.2 molar in said aluminum hydride.

6. The process as defined in claim 2 wherein the aluminum hydride feed is a slurry of solid aluminum hydride monodiethyl etherate in a mixture of diethyl ether and benzene, said slurry containing up to about 20 weight per cent of said aluminum hydride diethyletherate.

7. The process as defined in claim 3 wherein the equilibrium crystallizing liquid comprises from about 5 to about 6 volume per cent diethyl ether and from about 95 to about 94 volume per cent benzene.

8. The process as defined in claim 7 wherein the equilibrium crystallizing liquid consists of about 5.7 volume per cent diethyl ether, balance benzene.

* * * * *